(12) United States Patent
Boxwell et al.

(10) Patent No.: US 10,395,638 B2
(45) Date of Patent: *Aug. 27, 2019

(54) NATURAL LANGUAGE PROCESSING TO MERGE RELATED ALERT MESSAGES FOR ACCESSIBILITY

(71) Applicant: International Business Machines Corporation, Armonk, NY (US)

(72) Inventors: Stephen A Boxwell, Columbus, OH (US); Kyle M Brake, Dublin, OH (US); Keith G Frost, Durham, NC (US); Stanley J Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/644,767

(22) Filed: Jul. 8, 2017

(65) Prior Publication Data

US 2019/0013006 A1 Jan. 10, 2019

(51) Int. Cl.
| | | |
|---|---|---|
| *G10L 13/027* | (2013.01) | |
| *G10L 13/08* | (2013.01) | |
| *G10L 13/07* | (2013.01) | |
| *G06F 17/27* | (2006.01) | |
| *G06Q 30/06* | (2012.01) | |

(52) U.S. Cl.
CPC ............ *G10L 13/07* (2013.01); *G06F 17/271* (2013.01); *G06Q 30/0601* (2013.01)

(58) Field of Classification Search
CPC ... G10L 13/00; G10L 13/02; G10L 2021/065; G10L 13/027; G10L 13/08; G06F 17/27; G06F 17/277; G06F 17/2775; G06F 17/2785; G06F 17/2735; G06F 17/2745
USPC .................. 704/1, 9, 10, 258, 260, 267, 270
See application file for complete search history.

(56) References Cited

U.S. PATENT DOCUMENTS

| | | | | |
|---|---|---|---|---|
| 5,592,583 A | * | 1/1997 | Sakurai | .................. G10L 13/00 704/267 |
| 6,015,224 A | | 1/2000 | Greenstein | |
| 7,103,391 B2 | * | 9/2006 | Chan | ..................... H04M 19/04 455/3.06 |
| 7,391,300 B2 | * | 6/2008 | Inkinen | ................. H04M 19/04 340/384.1 |
| 8,387,006 B1 | | 2/2013 | Taylor | |
| 8,698,640 B1 | * | 4/2014 | Gropper | ................. G08B 21/10 340/286.02 |
| 9,235,384 B2 | | 1/2016 | Hsu | |
| 9,305,082 B2 | * | 4/2016 | Dorr | ................... G06F 17/2735 |
| 9,368,114 B2 | | 6/2016 | Larson | |
| 10,049,101 B2 | * | 8/2018 | Duan | .................. G06F 17/2785 |
| 10,055,436 B2 | * | 8/2018 | Douglas | .............. G06F 11/3034 |

(Continued)

OTHER PUBLICATIONS

IBM Patents or Patent Applications Treated as Related.

*Primary Examiner* — Martin Lerner
(74) *Attorney, Agent, or Firm* — Jeffrey S LaBaw; William Stock

(57) ABSTRACT

An apparatus and a computer program product for merging incoming alerts for accessibility are described. Two input alerts intended for presentation by a screen reader are received. If the two input alerts have arrived with a specified time interval, the two input alerts are combined into an output alert. The output alert is sent to a screen reader for presentation.

13 Claims, 7 Drawing Sheets

(56) References Cited

U.S. PATENT DOCUMENTS

| | | | |
|---|---|---|---|
| 2003/0004915 A1* | 1/2003 | Lin | G06F 17/271 |
| 2004/0196963 A1* | 10/2004 | Appelman | H04M 1/2478 |
| | | | 379/88.12 |
| 2006/0079295 A1* | 4/2006 | Chan | H04M 19/04 |
| | | | 455/567 |
| 2006/0277579 A1* | 12/2006 | Inkinen | H04M 19/04 |
| | | | 725/73 |
| 2008/0065391 A1* | 3/2008 | Omi | G10L 13/00 |
| | | | 704/275 |
| 2008/0243510 A1* | 10/2008 | Smith | G10L 13/00 |
| | | | 704/259 |
| 2010/0262908 A1 | 10/2010 | Gallo | |
| 2011/0112834 A1* | 5/2011 | You | G10L 13/08 |
| | | | 704/260 |
| 2014/0324438 A1* | 10/2014 | Hofstader | G10L 13/033 |
| | | | 704/260 |
| 2014/0344834 A1* | 11/2014 | Szabo | G06Q 10/107 |
| | | | 719/318 |
| 2015/0081307 A1* | 3/2015 | Cederstrom | G10L 13/043 |
| | | | 704/260 |
| 2015/0370453 A1* | 12/2015 | Kandekar | G06F 17/2745 |
| | | | 715/810 |
| 2016/0062540 A1 | 3/2016 | Yang | |
| 2016/0086516 A1* | 3/2016 | Beranek | G10L 13/04 |
| | | | 715/709 |
| 2016/0283532 A1* | 9/2016 | Douglas | G06F 16/22 |
| 2017/0280384 A1 | 9/2017 | Denzel | |
| 2018/0210864 A1* | 7/2018 | Zhang | G06F 17/212 |

* cited by examiner

NATURAL LANGUAGE PROCESSING TO MERGE RELATED ALERT MESSAGES FOR ACCESSIBILITY

BACKGROUND OF THE INVENTION

This disclosure relates generally to natural language processing. More particularly, it relates to using natural language processing to merge related alert messages for accessibility.

It is known for a computer to provide certain hardware and software technologies for "accessibility" that help visually or physically impaired people to use a computer. For example, the Accessibility Options control panel in the Windows™ operating system provides keyboard, mouse and screen options for people who have difficulty typing or seeing the screen. These technologies are also called assistive technologies.

One such program is a screen reader for the visually impaired. Screen readers are software programs that will provide synthesized speech to enable visually impaired users to use a computer operation system or computer applications. Typically, a screen reader will read text presented in one or more displays areas on the computer screen. A screen reader will also provide an alert notification when a user has taken an action. For example, if a user is attempting to purchase items from an online store, and pushes a button to add an item to a virtual cart, the screen reader will alert the user via synthesized speech that XYZ item was added to the cart.

One problem encountered with screen readers is that if the user takes actions too quickly, the screen reader does not provide the information accurately. For example, if a user wanted one XYZ item and one ABC item, but accidentally pressed the XYZ button twice, then the screen reader may either interrupt the first notification with a second notification or play two identical notifications in quick succession. The result is that the user is often unsure of what occurred and how to proceed.

This present invention provides a solution to this problem.

BRIEF SUMMARY

According to this disclosure, an apparatus and a computer program product for merging incoming alerts for accessibility are described. Two input alerts intended for presentation by a screen reader are received. If the two input alerts have arrived with a specified time interval, the two input alerts are combined into an output alert. The output alert is sent to a screen reader for presentation.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, preferred embodiments of the invention provide an improvement to screen reader technology that incorporates natural language processing (NLP) to merge input alerts into an output alert when appropriate. Similar elements of similar input alerts are merged into a single output alert, while dissimilar input alerts are concatenated into a single output alert. For example, if the user clicks to add one XYZ item and then one ABC item to the cart, instead of playing two messages by the screen reader, "You have added XYZ to your cart" and "You have added ABC to your cart", the NLP processing will identify these as the same type of alert and merge them. For example, a merged alert in embodiments of the invention will play, "You have added an XYZ and an ABC to your cart." By merging alerts, there is a reduced chance that one alert will play over another. In addition, the merged alert will often summarize the present state of the application more effectively for a listener than a series of alerts as the listener will not need to mentally keep track of a long list of actions.

Figure 1:
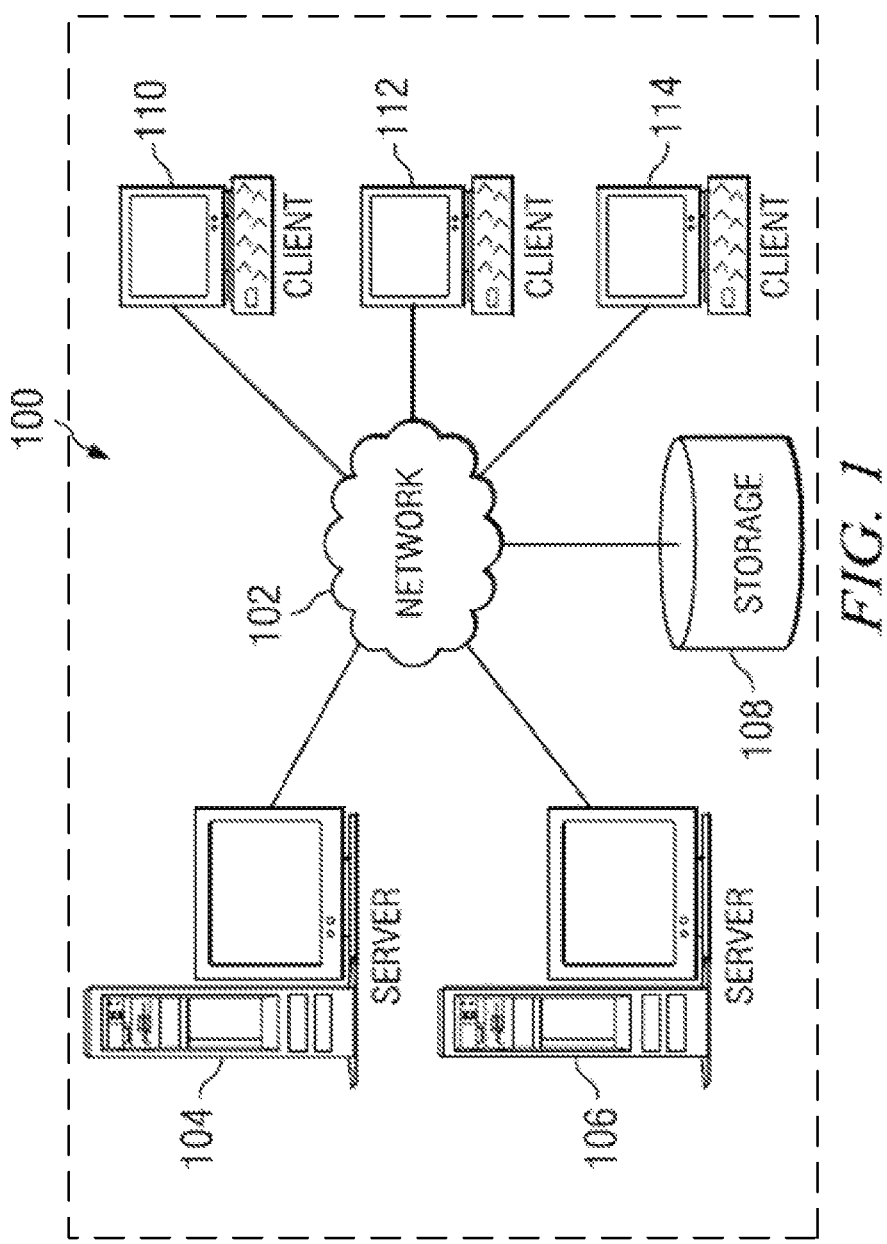
FIG. 1 depicts an exemplary block diagram of a distributed data processing environment in which exemplary aspects of the illustrative embodiments may be implemented.
Figure 2:
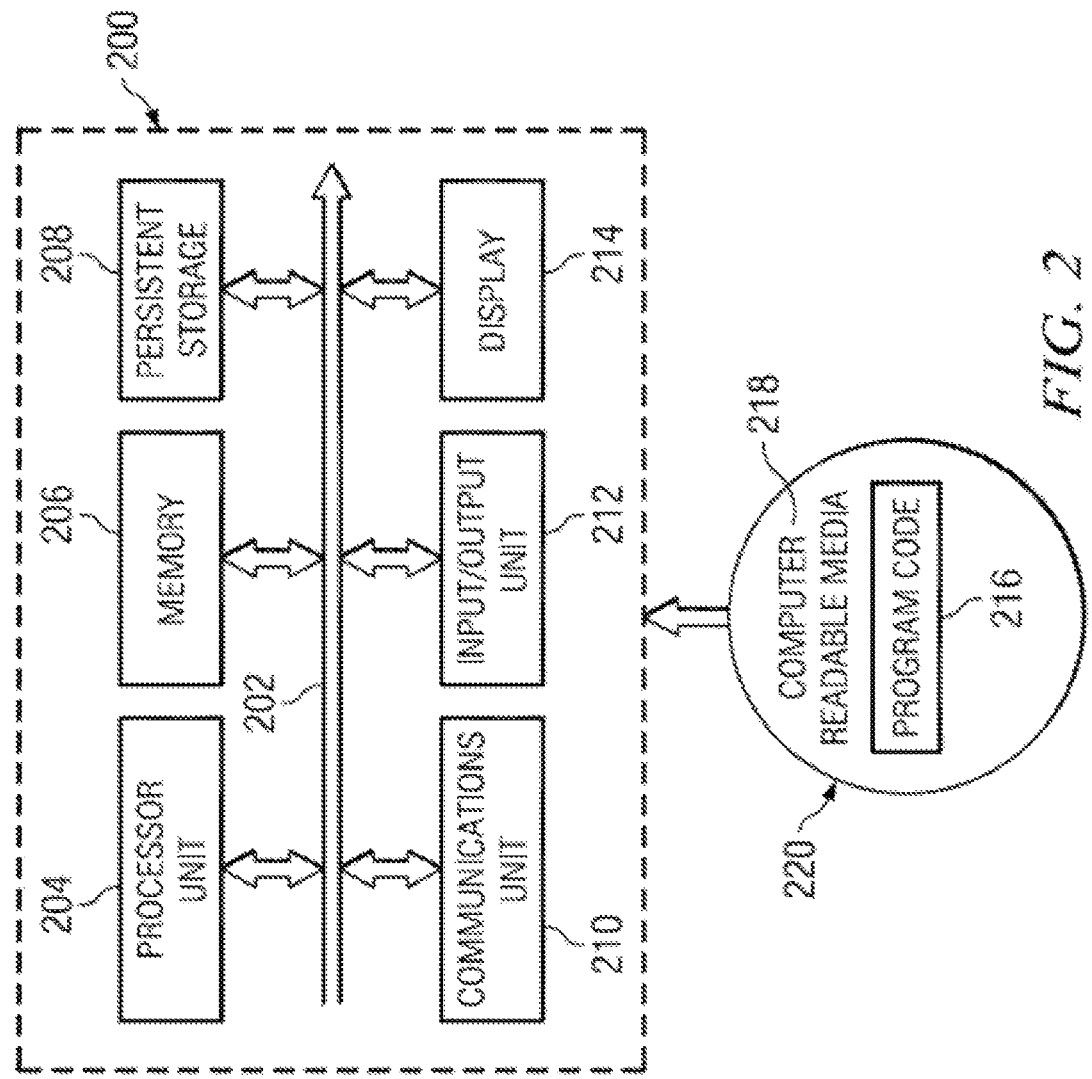
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Screen readers are applications which help make the visual content of the computer screen accessible to blind or visually impaired people. Screen readers work closely with the computer's operating system (OS) to provide information about icons, menus, dialogue boxes, files and folders. A Text-To-Speech (TTS) engine is used to translate on-screen information as well as user actions into speech, which can be heard, i.e. presented, through earphones or speakers. A visually impaired computer user typically uses a combination of screen reader commands and operating system commands to accomplish computer tasks. One common way for a screen reader to receive input is through an "alert".

Figure 3:
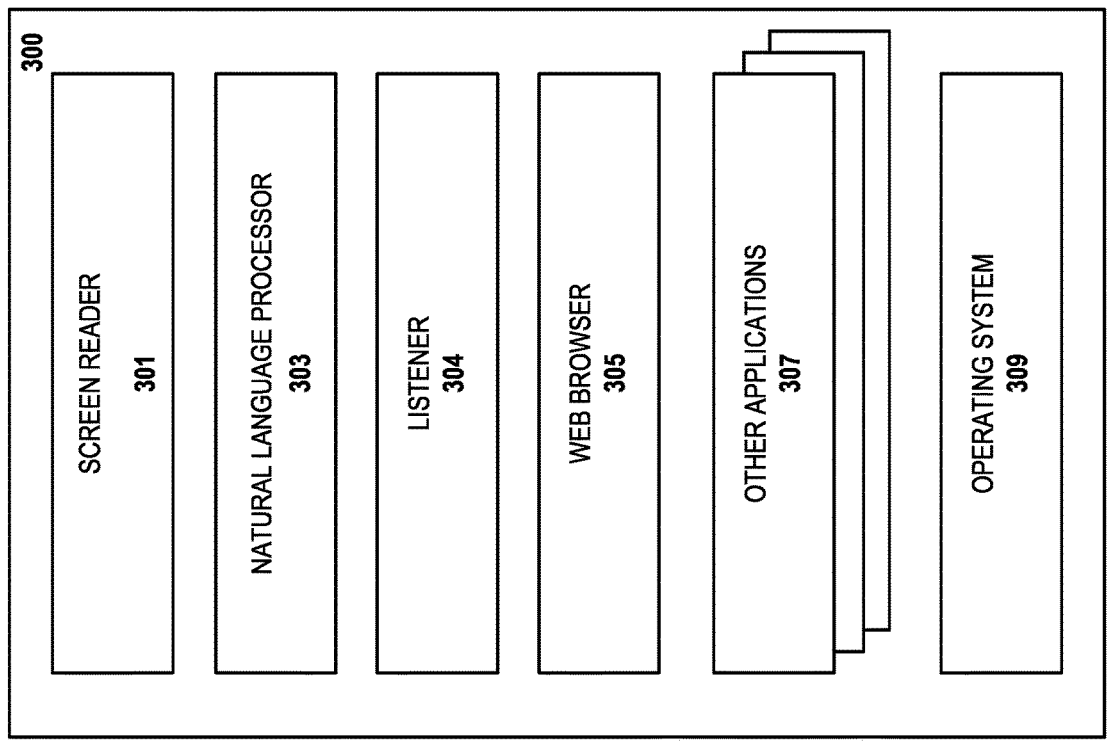
FIG. 3 illustrates a set of computer applications resident in memory of a computer system which can implement embodiments of the invention.

FIG. 3 is an exemplary illustration of the applications which would be resident in a computer capable of implementing the invention. The computer itself is similar to that described in association with FIGS. 1-2. In computer memory 300, a screen reader application 301 is resident. A natural language processing module 303, e.g., a natural language parser, is also resident, either as part of the screen reader 301 or as a separate application. A listener module 304 intercepts alerts intended for the screen reader, and if two or more alerts are received in quick succession, forwards them to the NLP module 303 for handling. A web browser 305 and a plurality of other applications 307 are also resident. The user interacts with the web browser 305 and applications 307 to perform tasks on the computer under the control of the operating system 309. The web browser 305 and the web pages that it interacts with, the applications 307 and the operating system 309 are all potential sources for alerts. In preferred embodiments of the invention, the web browser 305, at least some of the applications 307 and the operating system are "accessible" or "accessibility aware" programs. In embodiments of the invention, the web pages with which the web browser interacts are configured to send alerts to the screen reader when the user performs actions on an element in the web page.

Figure 4:
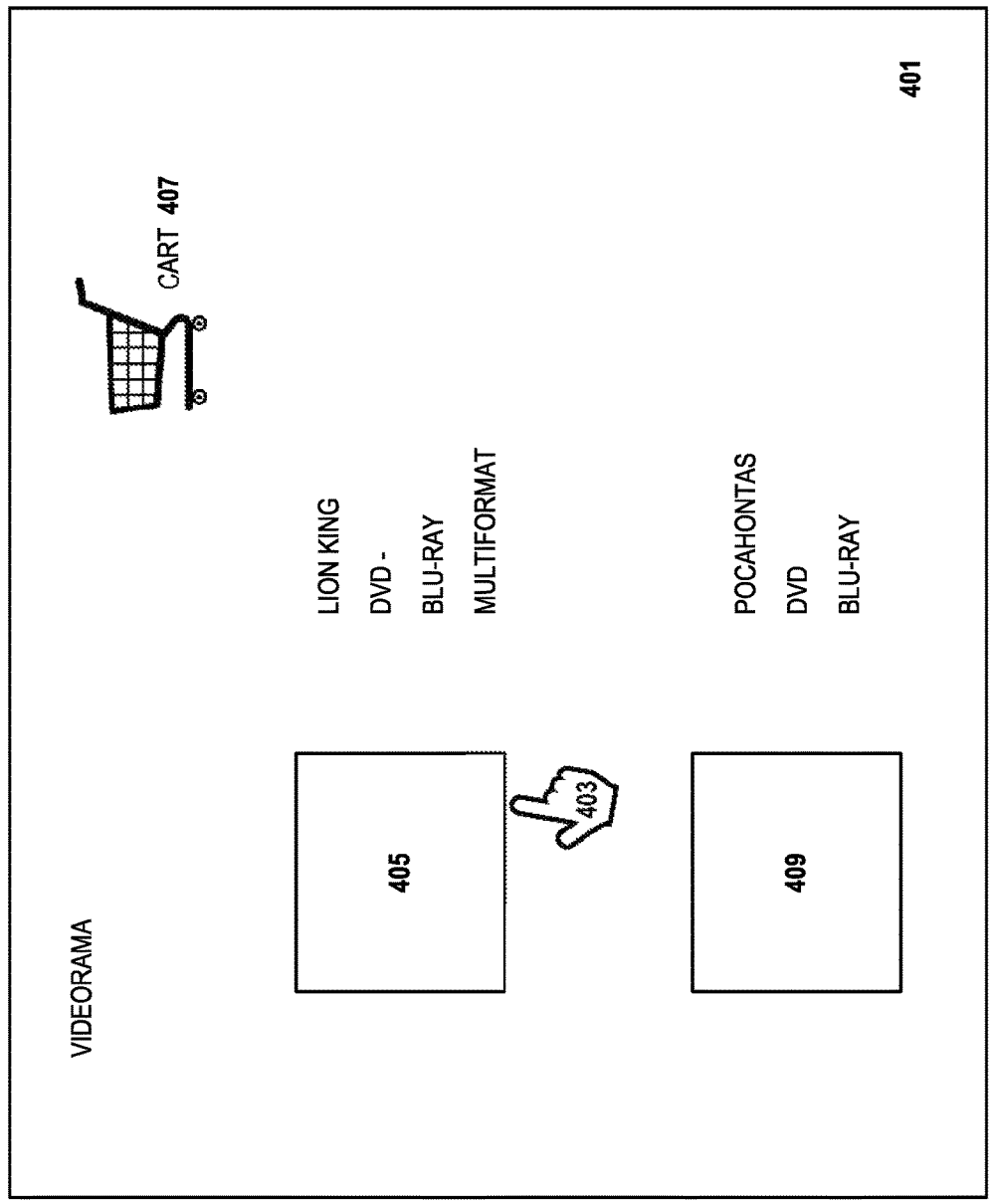
FIG. 4 illustrates a user interface of a web application which is enhanced with assistive technology.

Accessible web applications and web pages use alerts that screen readers use to alert the user to actions which the application and user have taken. For example, referring to the highly simplified illustration in FIG. 4 of a typical e-commerce application 401, an alert might be generated with the text "You have added one Lion King DVD to your cart" if the user clicks a mouse button while mouse cursor 403 is over icon 405. In a discovery UI application, an alert might be generated with the text "You have selected 'Wikipedia' as a source filter."

Screen readers that naively read these messages in order or that interrupt currently playing messages risk losing or duplicating information. For example, if a user accidentally clicks on a "buy" button 405 twice in an e-commerce application 401, the screen reader might say "You have added one Lion King DVD to your cart . . . you have added one Lion King DVD to your cart", leaving the user confused about if they added two DVDs, or whether the application just sent the alert twice. Even worse, the screen reader might interrupt and truncate the first message, saying "You . . . You have added 1 Lion King DVD to your cart" which does not accurately describe what has happened.

Embodiments of the invention use natural language processing (NLP) and alert generation techniques to merge related accessibility alerts. Continuing the e-commerce example, suppose the user buys two items in quick succession, for example, by mouse clicking over icon 403 and then icon 409. In this case, the e-commerce web application would generate two alerts: "You have added one Lion King DVD to your cart" and "You have added one Pocahontas DVD to your cart". In this example, embodiments of the invention would recognize the similarity between the two alerts and merge them into a single alert: "You have added one Lion King DVD and one Pocahontas DVD to your cart". This eliminates the possibility of cutting a first alert off to start a second one. Alternately, if a user accidentally clicks the "buy" button 403 twice, the prior art e-commerce web application would generate two alerts: "You have added one Lion King DVD to your cart" and "You have added one Lion King DVD to your cart". In this example, the inventive system would merge these alerts into a single alert saying, "You have added two Lion King DVDs to your cart."

Figure 5:
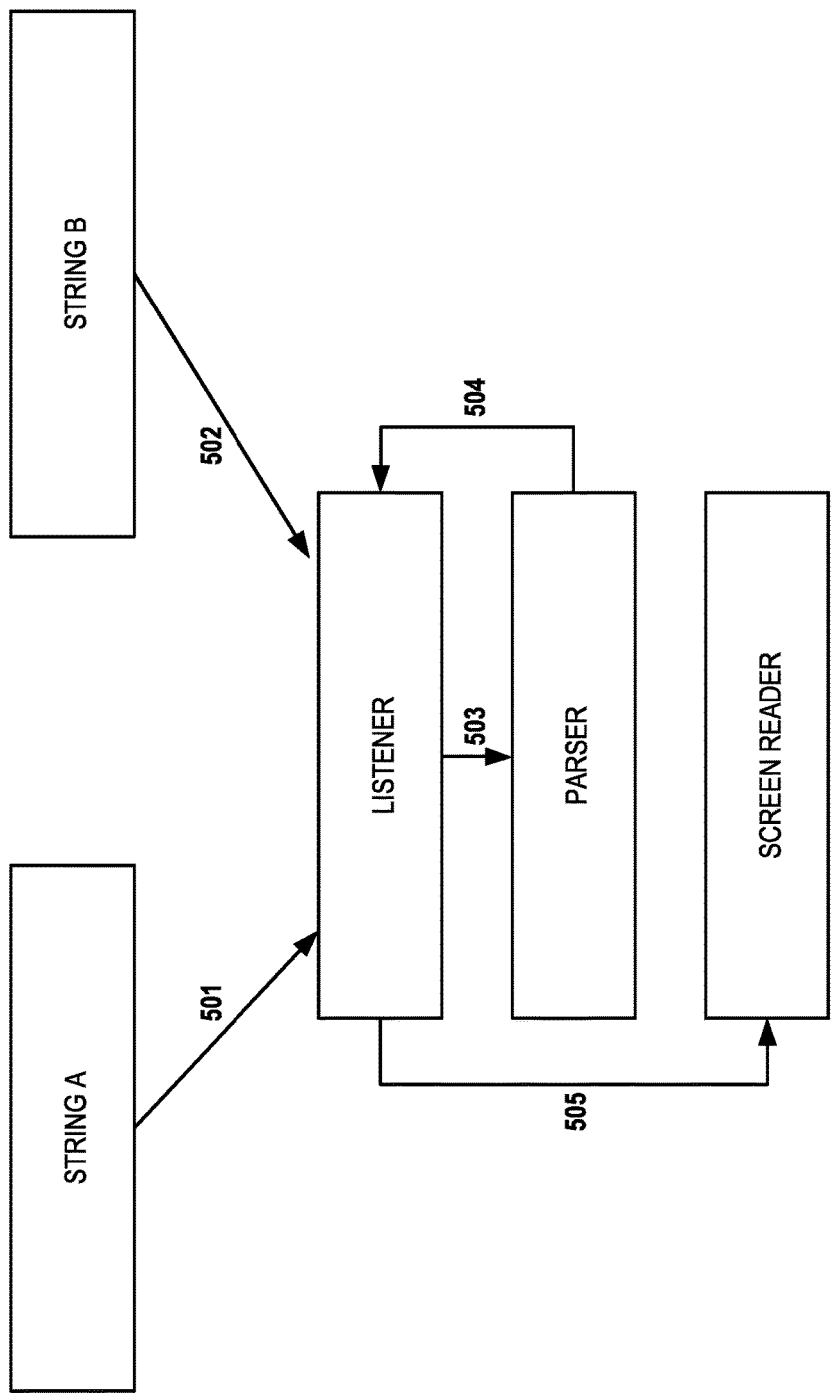
FIG. 5 illustrates a set of flows between elements in one embodiment of the invention.

In preferred embodiments of the invention, a listener module intercepts alerts intended for the screen reader. In this illustrative example, and referring to FIG. 5, there are two Alerts, represented as a list of strings, A and B. These alerts are intercepted by the listener module and represented by flows 501 and 502. After determining that the strings have arrived within a predetermined time interval, the listener feeds these strings to a natural language parser, flow 503. Embodiments of the invention use a dependency-style slot grammar parser, like the English Slot Grammar (ESG) parser used in IBM Watson. The dependency-style parsers are advantageous in that they are capable of determining relationships between parts of the alert, such as agent, direct object and indirect object relationships. Constituent-style parsers can be used in alternative embodiments of the invention, however, another module will need to be added to figure out the relationships between parts of the alert.

The parser will start at the root node (probably the matrix verb of a simple declarative sentence), to evaluate if the root node in alert A is equivalent to the root node in alert B. In one embodiment, equivalence or sufficient similarity between alerts is defined as having an equivalent headword (the same word or a synonym) and having the same set of outgoing link labels. "Equivalence", "similarity" and "sufficient similarity" are used interchangeably in the specification to mean "close enough" according to a similarity rule. In one embodiment, equivalence or sufficient similarity of the dependency as a whole may depend on the part of speech of the headword, or root node, enabling merged alerts like "You have added one copy of 'The Lion King' and one copy of 'Pocahontas' to your cart". Having root or child nodes that are identical is not required for node equivalence. Similarity rules are used in embodiments of the invention to determine whether the dependency trees are similar as well as determining whether corresponding nodes of the respective trees are similar. If the root nodes in the two alerts are equivalent, then the parser recursively steps down the dependency tree for each alert. In embodiments of the invention, equivalence or substantial similarity is established by comparing the dependency trees of the two alerts. If the two dependency trees are equivalent or substantially similar according to a rule then the alerts will be merged. If not, the strings in the non-equivalent alerts are joined using a coordination operation. One possible definition of a coordination operation is defined as concatenation of the two alerts, e.g., joined by "and" or another conjunction.

The parser returns the merged or concatenated alert back to the listener in flow 504. In flow 505, the listener module forwards the merged or concatenated alert to the screen reader which will present it to the user.

Figure 6:
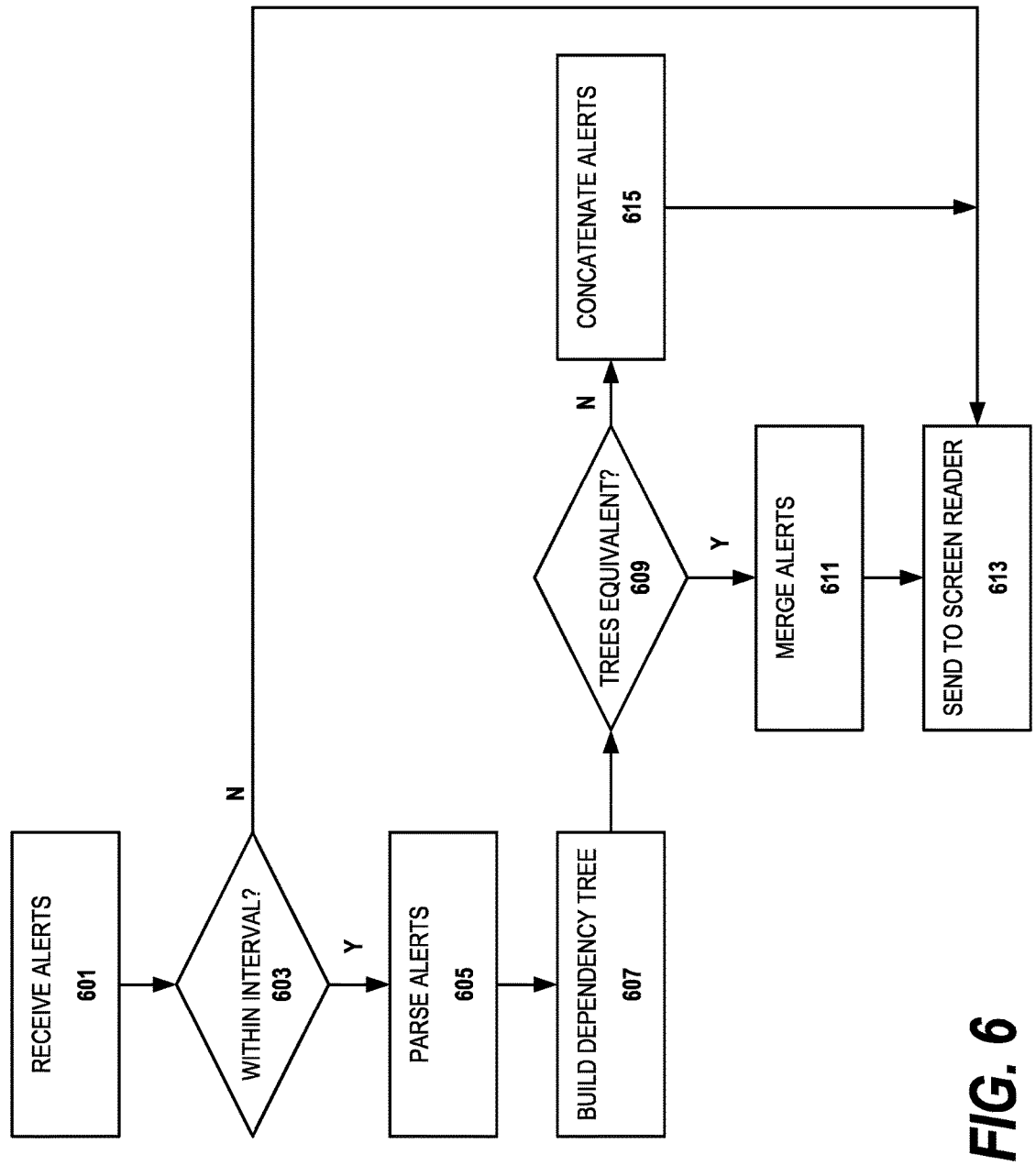
FIG. 6 is a flow diagram of creating an output alert according to an embodiment of the invention.

A more detailed example of the process in one embodiment is illustrated in FIG. 6 and described below. First, the listener module receives alerts from a web application, step 601. In this example, there are two alerts:
Alert A: "You have added a Lion King DVD to your cart."
Alert B: "You have added a Pocahontas DVD to your cart."

In step 603, the listener module determines whether the two alerts have come in a predetermined time interval. The predetermined time interval is preferably set so that alerts will not "collide", i.e. have one alert interrupt the other. In embodiments of the invention, the predetermined time interval is the range of 2-15 seconds. In an alternative embodiment, the predetermined time interval, or collision interval is dynamic and depends on the length of the first incoming alert. If the first alert is longer, i.e. taking longer to present, the collision interval will also be longer. If the two alerts have come in within the predetermined time interval, they are passed to the parser for analysis in step 605. If not, they are passed to the screen reader for presentation in step 613.

In step 605, the parser begins parsing the alerts. It starts building dependency trees for each alert (step 607) with the root node of each alert and determines the relationships between nodes. In preferred embodiments of the invention, the dependency tree is used to determine equivalence between alerts as well as providing information for a merge operation for equivalent alerts. In this example, both input alerts have a root node of "add" and have respective agent (subj), direct object (do) and indirect object (io) relationships between respective nodes of the alerts. The dependency trees are determined to be equivalent, step 609, so the parser begins the process of merging the alerts in step 611. At a high level, the merge step determines which parts of the input alerts should be part of the output merged alert. One preferred method for merging the alerts is described with reference to FIG. 7. The merged alert is sent to the screen reader for presentation to the user, step 613.

If the dependency trees were not judged equivalent or sufficiently similar, in embodiments of the invention, the process proceeds to step 615. Instead of determining which parts of the input alerts should be part of the merged alert, in this case, the two input alerts are concatenated together, using a conjunction like "and" to join the two alerts into a single output alert. Assume that instead of Alert B, an Alert C was intercepted "You are now in checkout." Also assume that the parser determined that Alert A and Alert C were not sufficiently similar to merge them. In this case, the parser would proceed to step 615 and create the concatenated alert ""You have added a Lion King DVD to your cart, and you are now in checkout."

Next, the concatenated alert would be sent to the screen reader for presentation to the user, step 613.

Figure 7:
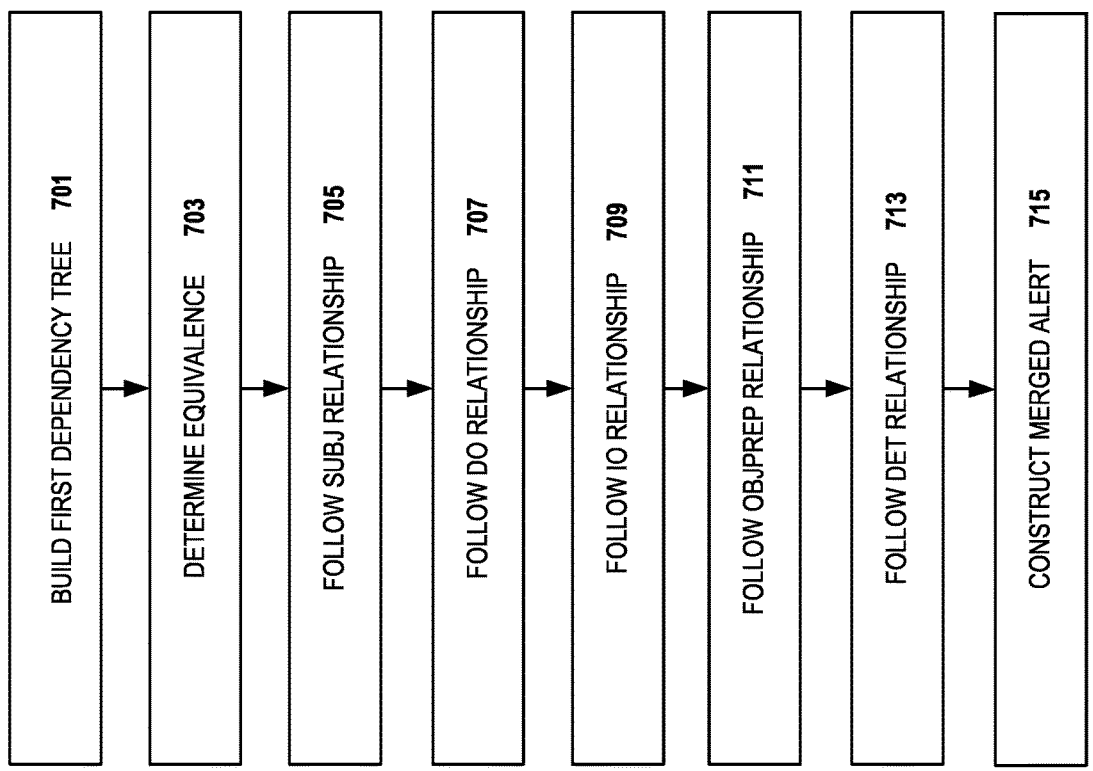
FIG. 7 is a flow diagram of examining the dependency trees of two input alerts to create an output alert according to an embodiment of the invention.

A more detailed flow diagram of some of the steps from FIG. 6 is illustrated in FIG. 7. In step 701, the parser begins parsing the alerts to build the first dependency tree for each alert. Keeping with the example above, with the root node of each alert, the parser determines the relationships between nodes. In this example, both alerts have a root node of "add" and have respective agent (subj), direct object (do) and indirect object (io) relationships between respective nodes of the alerts. To determine equivalency, in some embodiments of the invention, the full dependency tree is not needed, only enough of the tree to determine whether the equivalency rule is satisfied.

Exemplary equivalence rules in determining node equivalence used in embodiments of the invention include:
A. An exact string match of the word
B. An exact string match of the word and an exact match of the part-of-speech
C. A match of two words that are synonyms, e.g., "You have added a Lion King Videotape" and "You have added a Pocahontas VHS"
D. Near string matches, to account for typos Another type of equivalency rule is for determining whether the trees themselves are equivalent, e.g., the root node is the same or equivalent and a specified number or percentage of the sub-nodes are the same or equivalent. As another example, an equivalency rule for determining trees are equivalent in embodiments of the invention would be the root node is the same or equivalent and a second type of node is the same or equivalent.

Next, according to the equivalency rule, the two alerts are determined to be equivalent in step 703.

To determine which of the elements from the two input alerts should be selected for the output merged alert, in some embodiments, a full dependency tree is built, and the elements and their position in the dependency tree are compared for equivalence. In the example, the parser recursively steps down to each of the nodes attached to the outgoing links. Object preposition (objprep) relationships are also determined in some embodiments of the invention. Outgoing links are part of the syntactic model used in preferred embodiments of the invention. All links between words are directed. For example, there is a link going from the word "have" to "you". The link is directed from "have" to "you". So "have" has an outgoing link called "subj" going to "you". In the same way, "you" has an incoming link called "subj" coming from "have". This recursion provides information needed in the merge operation, step 715.

Next, in step 705, the parser follows the agent or "subj" relationship in both alerts. In both alerts, the "you" nodes are equivalent and are determined to be equivalent by the parser. The "you" nodes in each alert has no outgoing links so the recursion stops here in this branch of the dependency tree.

Next, in step 707, the parser follows the direct object or "do" relationship in both alerts. In this example, "Lion King DVD" is not equivalent to "Pocahontas DVD", so these nodes are stored to be combined via a coordination operation. The coordination operation means to combine the two phrases with the word "and". For example, "You have added an apple to your cart"+"You have added a banana to your cart"="You have added an apple and a banana to your cart".

Then, in step 709, the parser follows the indirect object or "io" relationship in both alerts. The node is "to" in both cases, and each node has an "objprep" relationship. These nodes are equivalent and the parser continues to the next level of the dependency tree. The parser follows the "objprep" relation for both alerts, step 711. In both cases, the node is "cart" and has a "det" relationship. The set (or "determiner") relationship is the name of the connection between a noun and the determiner (also called "article") that comes before it. For example, the relationship between "an" and "apple" in "You have added an apple to your cart". These nodes are equivalent and the parser continues to the next level.

The parser follows the "det" relationship for both alerts in step 713. The "your" nodes are deemed equivalent and are combined. Next, in step 715, the merged alert is constructed. The elements or nodes which were deemed equivalent are placed in the merged alert in the order in which they occurred in the input alerts. The nodes which were deemed not equivalent (or similar) are not merged, but combined as they exist in the input alerts in the merged alert. In preferred embodiments, a conjunction such as "and" is added between the two dissimilar elements. The merged alert of this example is "You have added one Lion King DVD and one Pocahontas DVD to your cart". Where elements meet a similarity rule, but are not identical, one of the elements is chosen for inclusion in the merged alert. In alternative embodiments, a predetermined synonym for a set of elements found in the input alerts is used in the merged output alert.

Another feature of the invention is where there is a number associated with similar elements in each alerts, the parser will sum the number of elements in the output alert presented to the user.

A developer of a web page can implement a service that listens for events which correspond to alerts. In a web page, an alert or alert role is added to new or existing web page elements to provide alerts to the user. Examples of alerts include: "An invalid value was entered into credit card field" and "your session with ABC company is about to expire". An alert can be added statically or dynamically into the HTML code by the developer. Alternatively, a script library can be used. ARIA is a standard which specifies how to include accessibility content in web pages, particularly dynamic user interface components using programming languages such as Ajax, HTML and JavaScript. Web developers increasingly use client-side scripts to provide user interface controls; ARIA describes how to add content such as an alert to make the UI controls accessible to a visually impaired user. The web page developer can add accessibility tags to web page content so that a screen reader will know which portions of the web page to read.

In embodiments of the invention, when an alert event is received by the listener, a configurable timer begins to count down. If the timer reaches 0, the text associated with the alert event is provided to the interface, e.g., a JavaScript Document Object Model (DOM) interface, which allows the screen reader to read it as an alert. If an additional alert event is received by the listener before the timer reaches 0, the new alert event's text is combined with the older alert event's text as described above and the timer is reset and begins to count down again. The timer is reset once the alerts are combined since if another alert comes into the listener before the timer reaches 0, it is then combined with the other input alerts via the same process. Once the timer reaches 0, the combined alert events' texts are provided in HTML to the interface that allows the screen reader to read them as a single alert. In preferred embodiments of the invention, each alert event can be configured to be allowed or suppressed, if it is a duplicate of an alert that is already in the listener.

When the input alerts are judged dissimilar according to the similarity rule, embodiments of the invention will concatenate rather than merge the input alerts to form the output alert. As an example, first input alert "you transferred $10 from your checking account to Kyle" and second input alert "you have selected a transfer checkbox" are dissimilar. Embodiments of the invention would create a concatenated alert "you transferred $10 from your checking account to Kyle and you have selected a transfer checkbox".

As an additional example of a merged alert consider the input alert "you transferred $500 from your spending to your checking account" and the input alert "you transferred $750 from your savings to your checking account". This could result in the output alert of "you transferred $500 from your spending to your checking account and $750 from your savings to your checking account". In this case, there were more dissimilar elements which needed to be included in the merged alert, but the similar elements "you" and "transferred" have been merged to occur a single time.

Another example of an output merged alert receives a first input alert "you transferred 500 dollars from your savings to your checking account" and a second input alert "you transferred 750 dollars from your savings to your checking account" within the predetermined time period. This could result in the merged alert "you transferred 1250 dollars from your savings to your checking account". This example shows merging quantities of similar elements in the input alerts to produce a single merged element.

An example of a syntactic/semantic parse tree (dependency tree) using the input alert "You have added one Pocahontas DVD to your cart" is as follows:

```
.------- subj(n)     you(1)       noun pron pl def h perspron anim
o------- top         have_perf(2,1,3) verb vfin vpres pl vsubj badvenadj
auxv
-------- auxcomp(ena) add1(3,1,6,u,7) verb ven
| .--- nadj       one1(4,u)    noun num sg
```

```
----- obj(n)      Pocahantas DVD(6)  noun propn sg glom notfnd unkph
----- comp(p)     to2(7,3,9)         prep pprefv motionp
| .- ndet         your1(8)           det sg possdet ingdet
--- objprep(n)    cart1(9)           noun cn sg
```

The diagram represents a syntactic dependency tree, which is recognized by those skilled in the art.

Here is an example of a pseudo-code implementation of a listener function. In preferred embodiments of the invention, the listener function would be implemented in JavaScript.

Listener:

```
alertCount = 0;
alertList = [ ];
When('alert', AlertTriggered( ));
AlertTriggered = function(newAlert, allowDuplicateAlerts) {
    showAlert = false;
    if(alertCount == 0) {
        alertText = "";
    }
    if(allowDuplicateAlerts || !alertList.includes(newAlert))) {
        alertCount++;
        alertList.add(newAlert);
        currentAlertCount = alertCount;
        alertText = combineAlerts(alertText, newAlert);
        Wait(function( ) {
            if(currentAlertCount == alertCount) {
                showAlert = true;
                alertCount = 0;
                alertList = [ ];
            }
        }, delayTime);
    }
}
```

In embodiments of the invention, the listener function listens for alerts and sends them to be combined by the parser if appropriate. The listener function can be triggered by the user. The following is pseudo-code for triggering the function.

Triggering an Alert Event:

```
TriggerEvent('alert', alertText);
TriggerEvent('alert', alertText, true);
TriggerEvent('alert', alertText, false);
```

In alternative embodiments of the invention, rather than having a separate listener module to intercepts alerts intended for the screen reader and an NLP parser module to determine the similarity of the alerts and merge the alerts, these capabilities are built into a screen reader.

The present invention has advantages over the prior art. Rather than allow two alerts to collide in the screen reader, the present invention intercepts a plurality of input alerts and combines them into a single output alert for presentation by the screen reader. Where the input alerts satisfy a similarity rule, the two input alerts are merged into a merged alert. Where the input alerts do not satisfy the similarity rule, the two input alerts are concatenated into the output alert. By merging alerts, there is a reduced chance that one alert will play over another alert. In addition, the merged alert will often summarize the present state of the application more effectively for a listener than a series of alerts as the listener will not need to mentally keep track of a long list of actions.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. Apparatus, comprising:
a processor;
computer memory holding computer program instructions executed by the processor for searching for merging incoming alerts for accessibility, the computer program instructions comprising:
program code, operative to receiving two input alerts intended for presentation by a screen reader;
program code, operative to determining whether the two input alerts arrived within a specified time interval;
program code responsive to determining that the two input alerts arrived within the specified time interval, operative to determining whether the two input alerts are similar;
program code responsive to determining that the two input alerts are not similar, operative to combining the two input alerts in a concatenation operation to produce an output alert, wherein the output alert is a concatenated alert; and
program code, operative to sending the output alert to the screen reader for presentation.

2. The apparatus as recited in claim 1, wherein the similarity of the two input alerts is determined by comparing dependency trees of the two input alerts.

3. The apparatus as recited in claim 2, wherein an equivalency rule is used for determining whether the dependency trees are similar, wherein the equivalency rule is that a root node of each tree is the same or equivalent and a specified number or percentage of the sub-nodes are the same or equivalent.

4. The apparatus as recited in claim 2, wherein the similarity rule used for determining whether the dependency trees for two input alerts are similar is if the root nodes of the two dependency trees are similar and a predetermined number of corresponding sub-nodes of the two dependency trees are similar, then the two dependency trees are similar.

5. The apparatus as recited in claim 1, further comprising:
program code, operative to reset a timer after a second input alert is received to determine whether a third input alert arrived within the specified time interval of the second input alert.

6. The apparatus as recited in claim 1, wherein the specified time interval is a function of a time interval required to present a first input alert.

7. A computer program product in a non-transitory computer readable medium for use in a data processing system, the computer program product holding computer program instructions executed by the data processing system for merging incoming alerts for accessibility, the computer program instructions comprising:
program code, operative to receiving two input alerts intended for presentation by a screen reader;
program code, operative to determining whether the two input alerts arrived with a specified time interval;
program code responsive to determining that the two input alerts arrived within the specified time interval, operative to combining the two input alerts into an output alert;
program code responsive to determining that the two input alerts arrived within the specified time interval, operative to determining whether the two input alerts are similar;
program code responsive to determining that the two input alerts are similar, operative to combining the two input alerts in a merge operation wherein the output alert is a merged alert, wherein the merge operation merges two similar elements which occur in each of the two input alerts into a single element;
program code responsive to determining that the two input alerts are not similar, operative to combining the two input alerts in a concatenation operation, wherein the output alert is a concatenated alert; and
program code, operative to sending the output alert to the screen reader for presentation.

8. The computer program product as recited in claim 7, further comprising program code operative to comparing dependency trees of the two input alerts to determine the similarity of the two input alerts.

9. The computer program product as recited in claim 8, wherein an equivalency rule is used for determining whether the dependency trees are similar.

10. The computer program product as recited in claim 9, wherein the equivalency rule is that a root node of each tree is the same or equivalent and a specified number or percentage of the sub-nodes are the same or equivalent.

11. The computer program product as recited in claim 8, wherein the similarity rule used for determining whether the dependency trees for two input alerts are similar is if the root nodes of the two dependency trees are similar and a predetermined number of corresponding sub-nodes of the two dependency trees are similar, then the two dependency trees are similar.

12. The computer program product as recited in claim 7, wherein the specified time interval is a function of a time interval required to present a first input alert.

13. The computer program product as recited in claim 7, wherein a similarity rule is used to determine whether corresponding elements from respective input alerts are similar.

* * * * *